US006965672B1

(12) United States Patent
Faiçal

(10) Patent No.: US 6,965,672 B1
(45) Date of Patent: Nov. 15, 2005

(54) ELECTRONIC SWITCHING SYSTEM

(76) Inventor: Loubaris Mohamed Faiçal, 39, Rue Fatime Al Fihriya, Rabat (MA)

( * ) Notice: Subject to any disclaimer, the term of this patent is extended or adjusted under 35 U.S.C. 154(b) by 0 days.

(21) Appl. No.: 09/535,161

(22) Filed: Mar. 24, 2000

(30) Foreign Application Priority Data

Sep. 24, 1996 (FR) .................................. 96 11956
Sep. 19, 1997 (WO) ...................... PCT/FR97/01656

(51) Int. Cl.$^{7}$ ................................................ H04M 1/68
(52) U.S. Cl. ...................... 379/442; 379/161; 379/168; 379/169; 379/184; 379/443; 379/399.01
(58) Field of Search ................................ 379/168, 161, 379/184, 169, 399, 387, 442–443

(56) References Cited

U.S. PATENT DOCUMENTS 3,829,619 A * 8/1974 Close et al. ................ 379/379
4,281,220 A * 7/1981 Frailey ........................ 379/52
4,825,465 A * 4/1989 Ryan ..................... 379/399.01
5,444,772 A * 8/1995 Coker ........................ 379/161

* cited by examiner

*Primary Examiner*—Sinh Tran
*Assistant Examiner*—Walter F Briney, III
(74) *Attorney, Agent, or Firm*—Crowell & Moring LLP

(57) ABSTRACT

An electronic switching system, comprising a common source of voltage to a plurality of user stations connected in parallel, an electronic means of connection to electrically connect a chosen user station to the common source of voltage, and a means of disconnection command with an optical coupler to control automatically the electronic disconnection of other user stations to the common source of voltage. A default user station is normally the chosen user station. There are means of separation of grounds for the chosen user station and the other user stations. In a preferred embodiment there is a cell for each user station, with each cell including in series a means for separation of the grounds, a means for electrically connecting terminals of the chosen station at boundaries of the source of voltage, a means for filtering a signal and for rectification of alternating current, a means for determination of a response time of the cell, and a means for command of disconnection including optical couplers to control the electronic disconnection of the source of the voltage to the other cells. The optical couplers preferably include a light emitting diode and a light receiving transistor. The optical couplers may be connected in series or in parallel. Preferably, response time is determined by a circuit in each cell containing at least one resistor and at least one capacitor.

15 Claims, 3 Drawing Sheets

16 26 28 30 34 44 64 48 50 18 20 22 24 R1 R2 R3 32 B1 66 M1 R4 38 36 40 42 R5 R6 46 R7 52 54 56 58 B2 M2 B3 M3 UE 10 60 12 62 14

ELECTRONIC SWITCHING SYSTEM

BACKGROUND OF THE INVENTION

1. Field of the Invention

The present invention relates to systems in which user stations, such as communications terminals in general or telephone sets in particular, are connected in parallel to the same source, but only one can be connected with the source at a given moment. This invention particularly relates to a device for connecting the source and one of the user stations, while excluding any connection of the source with the other stations.

2. Background

There are many systems in which a source of voltage is common to several user stations, but where only one station can be connected to the source at a given moment, excluding the other stations. Such a source can provide direct or alternating current, and digital or analog data; e.g., a telephone line on which several telephone sets can be connected. The connection of many terminals on a common trunk can be done in different ways, of which the simplest is a connection of the stations in parallel. Connection in parallel, however, presents major disadvantages. The telephone line regards the value of the electric parameters divided by the number of the stations placed into parallel. Connection in parallel presents problems of adaptation; moreover, it does not ensure communications secrecy. The stations are always connected simultaneously on the common trunk.

Another solution consists in placing a mechanical reverser in the circuit; in this case there is no problem of adaptation. But the disadvantage of this solution is that it requires human intervention, and when necessary displacement for manipulations. Still another solution consists in installing an automatic reverser containing electromagnetic relays. The miniature relays (which are essential for this solution) may be on integrated circuits, and make it possible to produce perfect switches, but this requires relatively high operating currents. I.e., a relay reverser of 5 volts consumes between 25 and 30 milliamps.

SUMMARY OF THE INVENTION

The invention is an electronic switching system for several user stations having a common source of electric power and/or data. Each user station has a ground separation means, to separate its dedicated station ground from the other user station grounds, a means of electrical connection with the common source, and a means of commanding disconnection by galvanic insulation with an optical coupler to disconnect without interaction the common source from the other stations as soon as the chosen station is connected.

The principle object of the invention is to provide a simple device allowing automatic electronic connection between a source and one among several stations connected in parallel to the source, while excluding connection between every other station and the source.

Another object of the invention is to provide an electronic switching system intended to connect the common power/data source to a chosen station among a plurality of user stations, connected in parallel to the source, while excluding the others.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
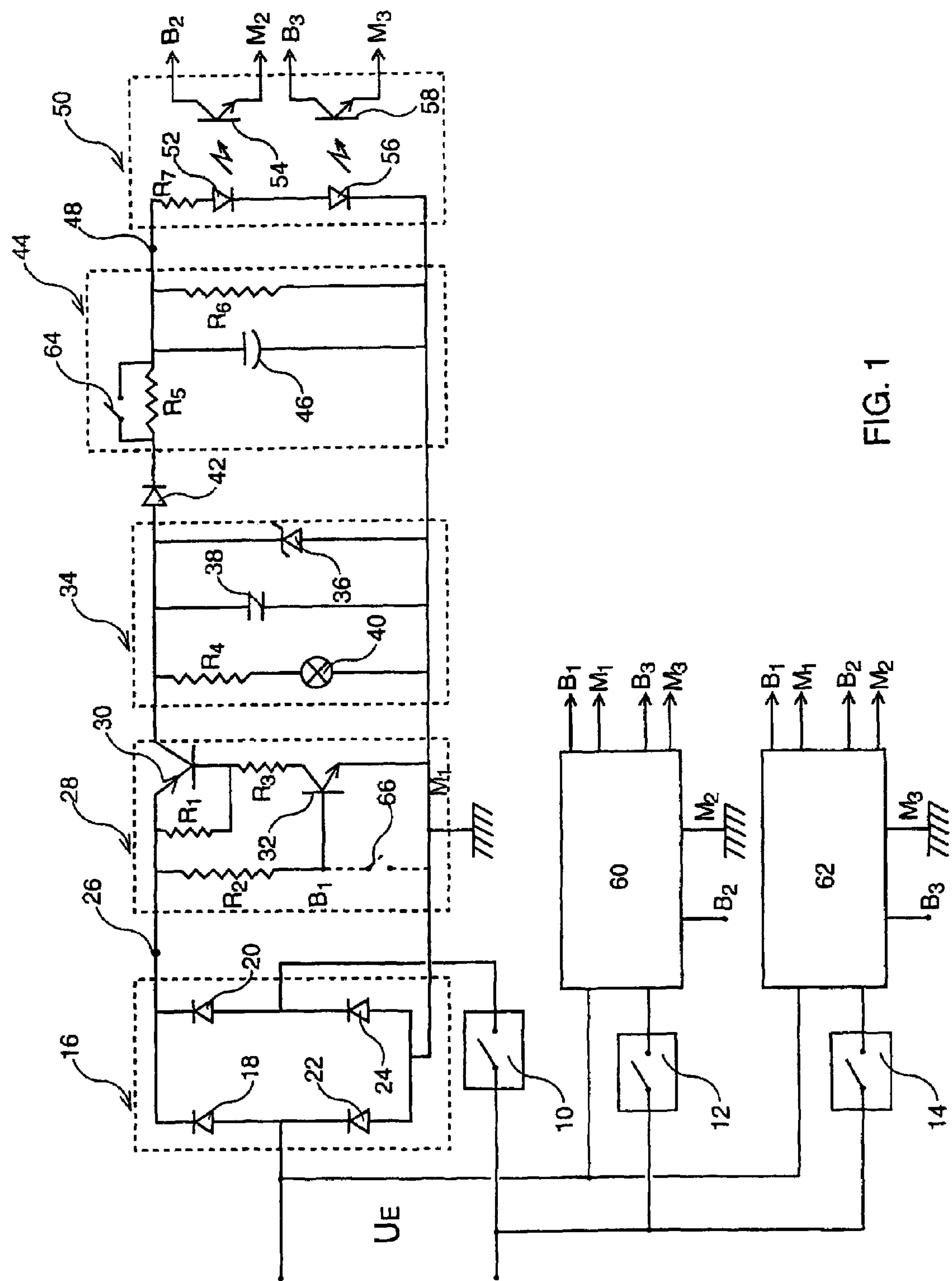
FIG. 1 is a schematic representation of the first preferred embodiment of the invention, ensuring connection between a source of common tension and one among three telephone sets.

The first preferred embodiment of the present invention is illustrated in FIG. 1. It may, for example, be a telephonic system comprising a common exchange line, whose variable voltage is Ue, and can be connected to one of three user stations 10, 12 or 14. (Another possibility is that the user stations could be motors.) Each station has been represented by a switch schematising the station disconnected from the telephone line as long as the handset is not raised. The raising of the handset closes the switch.

Owing to the fact that it has three user stations, the apparatus illustrating the invention includes three identical cells associated with each station. Only the cell associated with item 10 has been represented in detail. The description which follows considers first of all the case where a user station asks for connection to the exchange line. This is schematised by the closing of the switch 10. A voltage is then applied to the first cell 16. This cell is formed by a bridge of diodes 18, 20, 22, and 24 for the rectification of alternating current. Rectified output 26 from the element 16 is the input of a commutation block 28 which functions like a switch. In a well known way, element 28 is made of two transistors, a transistor of connection 30 (or ballast transistor) and a transistor of command 32. The base of the transistor 30 is connected to input 26 by resistor R1 and the base of transistor 32 is connected to input 26 by resistor R2. When a positive voltage is applied to input 26, transistor 32 will be saturated ensuring conducting, which ensures the conduction of transistor 30 and the flowing of current through the circuit when is then established. In the alternating current's positive half-wave, the current flows through by diode 18, input 26, resistor R2, transistor 32, and diode 24. In the alternating current's negative half-wave, the current flows through diode 20, input 26, resistance R2, transistor 32, and diode 22. In both half-waves, the circuit is grounded at M1. At this time, connection is established between the telephone line and item 10. The loop current circulates in element 16, transistor 30 and element 28.

The third element 34 is mainly a means to filter the signal and to let the loop current pass. It is made of a zener diode 36 in parallel with a capacitor 38. A light emitting diode (LED) 40 is in series with a resistor R4. The LED is used to visually indicate that the telephone set is active when switch 10 is closed. When a positive voltage is applied to input 26, transistor 30 conducts, and a current circulates in the zener diode 36. A circuit is then established in the positive half-wave, through diode 18, input 26, the transmitter and collector of transistor 30, the element 34 with its zener diode, and the diode 24, grounded at M1; and a circuit is established in the negative half-wave through diode 20, input 26, the transmitter and collector of transistor 30, the element 34 with its zener diode, and the diode 22, also grounded at mass M1.

Element 34 thus providing a continuous voltage of command, it is connected by means of diode 42 to element 44 to determine the time of commutation of the device. This element is made of a resistance R5 in series with a polarised capacity 46, and of a resistance R6 in parallel on capacity 46. Finally, output 48 from the element 44 is connected to the input of element 50 to command the disconnection of the other cells. This element includes, in series with resistor R7, as many optical couplers as than there are other cells. In the example described, there are thus two optical couplers to place in series or parallel to block the two other cells in the system. Each optical coupler incorporates one light emitting diode and one light receiving transistor (phototransistor). Thus, the first optical coupler contains light emitting diode 56 and the phototransistor 58. When the light emitting diodes 52 and 56 are subject to a positive voltage at their entry 48, the associated phototransistors become conductive. Each phototransistor is connected between the base and the ground of the command transistor of the corresponding cell. The base of the command transistor thus takes the potential of the ground when the phototransistor becomes conductive, which entails the blocking of the two transistors from the element 28 (transistors 30 and 32). Consequently, the phototransistor 54 connected between the points B2 and M2 of the second cell, disconnects completely this cell from the source. And phototransistor 58 connected between points B3 and M3 of the third cell in the same way disconnects that cell from the source. Thus, it is certain that, when the user station with switch 10 is connected to the source Ue, the two other user stations with switches 12 and 14 are disconnected from this same source. Although they are not represented in detail, there are two other cells: 60 for the user station with switch 12 and 62 for the user station with switch 14. Each cell is similar to the cell with switch 10 that is shown in detail. The terminals of the two phototransistors of cell 60 are connected respectively to points B1 and M1 of the first cell, and to points B3 and M3 of cell 62. For example, if the user of the station with switch 12 stays connected, the switching transistors of the two other cells will be blocked, owing to the fact that their base is connected to their ground (B1 is connected to M1 and B3 is connected to M3).

Element 44 determines response time. Indeed, response time is determined by the value of resistors R5, R6 and capacitor 46, as well as the impedance value from element 50. Generally, the response time depends on both the nature of the system and the application for which it is used. In the case of telephone sets, the switching response time must be lower than the response time of the telephone line. Besides that there is a release response time when the user hangs up the telephone. The blocking response time is equal to the product of the resistance of R5 and the capacitance of 46 (R6 is weak compared to the equivalent input resistance of element 48). One thus chooses the resistance of R5 quite lower than the resistance of R6 to calculate the value of the capacitance of 46 for the desired response time. In the case of a telephone line one will take, for example, the blocking time, which is equal to two milliseconds, and one will take the time of releasing, which is equal to twenty milliseconds. One should take account of the 300 millisecond response time of the telephone line (line disconnect) and the time of the telephone line signalization flash (loop disconnect).

It is possible that the telephone set which has the shortest response time (thanks to block 44), therefore that which electronically connects the first on the line, is not the required station. The connected user informs the requested user station to hang up the telephone handset. This latter will be connected to the telephone line once the first station hangs up again.

Figure 2:
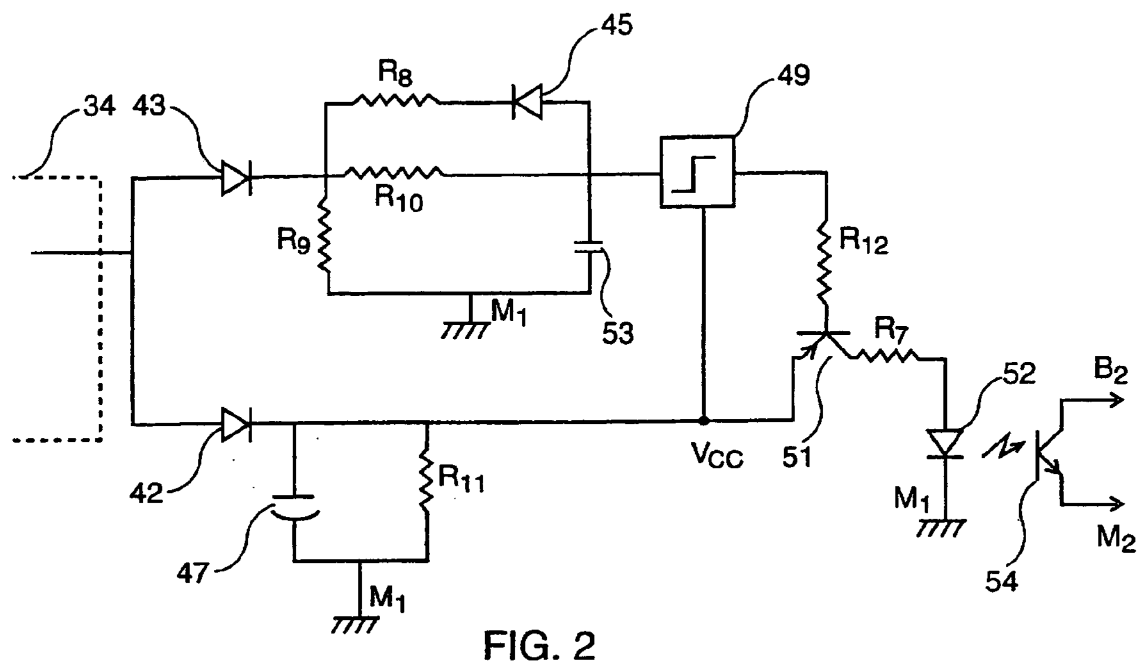
FIG. 2 is a detail view of the response time determining element in the second preferred embodiment of the invention.

The second preferred embodiment of the invention is for uses which require more precise switching times. The second embodiment is the same as the first embodiment, except that element 44 is replaced with the circuit illustrated on FIG. 2. This circuit includes element 49 which can be an integrated circuit reacting on thresholds of precise switching (trigger circuit).

The preceding description relates to the case where one of the user stations requires connection to the exchange line. Moreover, the case would be envisaged where the exchange line requires the connection to one of the stations with switches 10, 12 or 14. The determination of the response time of each station makes it possible to have a default station. It will be the station which has the smallest response time. This default station will be first connected to the telephone line in the event of ringing. Resistor R5 from element 44 is determining in this case, if one keeps the same capacitance in each cell. One can even replace R5 by a thermistor to vary the response times of the various cells to connect the stations one after the other in the event of returning calls.

Figure 3:
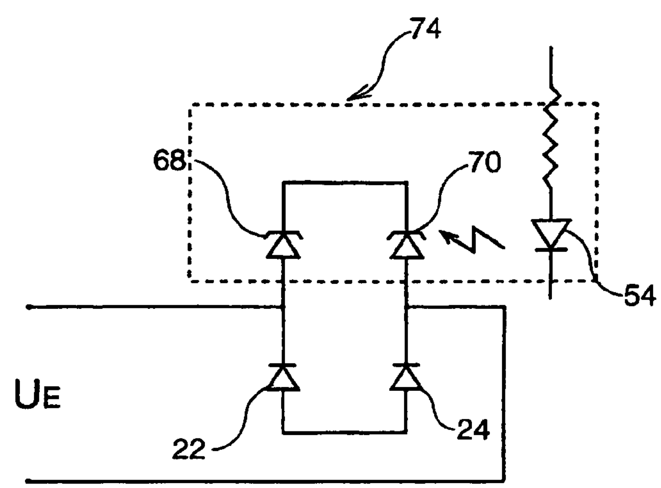
FIG. 3 is a detail view of the disconnecting element in the third preferred embodiment of the invention.

As an option, one can place switches 64 and 66 in the various cells to force the response times manually or to totally disconnect from the telephone line (see FIG. 1). Another alternative is the third preferred embodiment of the invention, which is the same as the first embodiment, except for the part illustrated in FIG. 3. It consists in replacing the two diodes 18 and 20 of element 16 with two thyristors 68 and 70, which are light receivers, controlled directly by photo emitting diodes such as 54. Under operation, the activation of the optical coupler of the cell associated with the default station ensures the blocking of the other cells and their total disconnection from the default cell.

Many applications of the device of the invention are possible in the field of the communications. Thus, one can consider a system comprising several telecopiers in emission mode and of which only one will even remain in emission-reception mode thanks to these devices. This applies in the same way to telecommunications modems and terminals.

Figure 4:
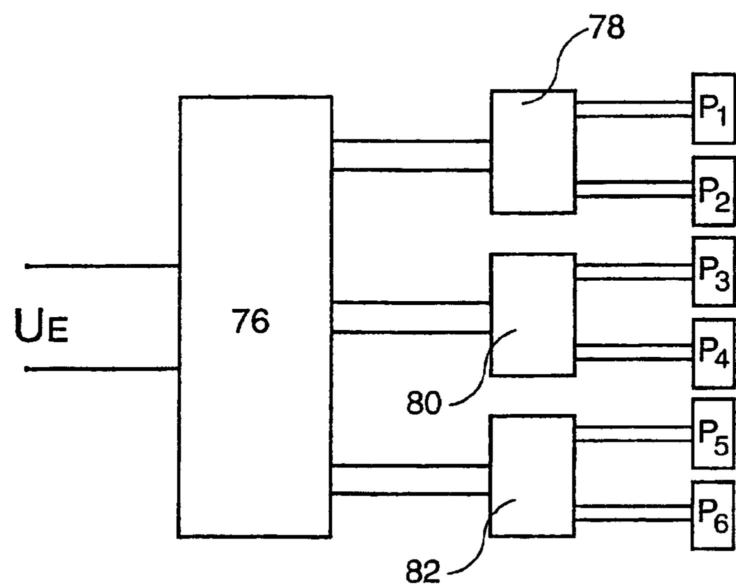
FIG. 4 is a schematic representation of a branch system between a source and six user stations.

The invention can also be used for applications in which the common source is a voltage of alimentation. E.g., the commands of engines connected in parallel and from which the running of only one excludes the others. FIG. 4 shows a device where the user stations with switches 10, 12 and 14 are replaced by three two-station devices 78, 80 and 82. The total assembly allows the exclusive connection to the exchange line of one of the stations P1, P2, P3, P4, P5 or P6.

Figure 5:
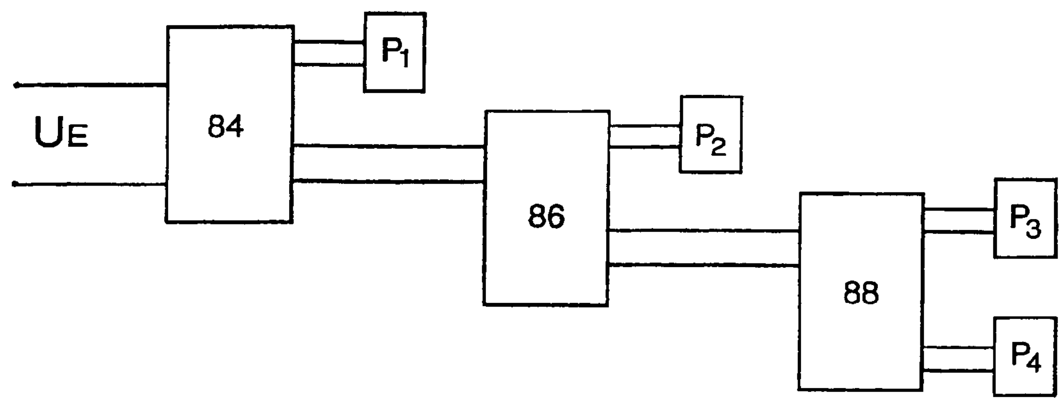
FIG. 5 is a schematic representation of a cascading branch system between a source and four user stations.

FIG. 5 illustrates stations in a cascading relationship. The architecture of FIG. 5 limits the number of stations that can be placed in cascades. The continuous voltage drop caused by cells 84, 86 and 88 depends on the value of the components of the cells. Thus, the sum of the voltage drops of elements corresponding to 16, 30 and 34 in FIG. 1 determines the numbers of the cells that can be placed in cascades. Elements 16 and 30 in saturation mode cause a voltage drop of about 1.3 volts. If one takes a zener diode of 2 volts a total continuous voltage drop of 3.3 volts for each cell is obtained. The optical coupler can be placed in element 50 in series or in parallel. In the case of FIG. 1 diodes 52 and 56 are placed in series. It is judicious to place the inputs of the optical couplers in parallel in order to have the minimal value of diode 36.

It should be noted that the dynamic attenuation of the connected cell signal is insignificant because element 16 and transistor 30 and diode 36 present a very weak attenuation parameter in saturated mode. In short, one can design a device with several cells according to the invention, insofar as the components of element 50 are placed in parallel. In this case the continuous voltage drop caused by this device will remain equal to that of a cell.

It is to be understood that the present invention is not limited to the preferred embodiments described above, but encompasses any and all embodiments within the scope of the following claims.

I claim:

1. An electronic switching system for connecting electronically a common source of voltage (Ue) to a chosen user station selected from a plurality of user stations connected in parallel; the system comprising a plurality of identical cells equal to the number of user stations, each cell corresponding to one user station, wherein each cell comprises a first electronic device for rectification of alternating and direct line current through the cell and for electronic separation of a ground of said each cell from respective grounds of other ones of said cells, a second electronic device to connect a respective corresponding user station to the common source of voltage, and a device for providing an automatic blocking command comprising a plurality of optical photo couplers each associated with one of the cells not corresponding to the chosen user to maintain separation of the different grounds of the cells and to control blocking of electronic connection of user stations other than the chosen station to the common source of voltage, whereby upon connection of the chosen user station to the common source of voltage, flow of restored continuous current through the photodiodes in the cell corresponding to the chosen station saturates corresponding phototransistors located in cells not corresponding to the chosen user station which in turn block ballast transistors located in said cells not corresponding to the chosen user station, thereby blocking the connection of user stations other than the chosen station to the common voltage source.

2. An electronic switching system according to claim 1, wherein there is a default user station that is normally the chosen user station.

3. An electronic switching system according to claim 2, wherein the cell for a default user station has a response time lower than response times of the other cells.

4. An electronic switching system according to claim 3, in which at least one of the cells includes a switch in parallel with a resistor, and when the switch is closed the cell of user station becomes the default user station.

5. An electronic switching system according to claim 1, wherein each cell further includes;

a device for filtering a signal and restoration of a command voltage supply; and a device for determination of a response time of the cell.

6. An electronic switching system according to claim 5, wherein the optical couplers of each cell are electrically connected in series.

7. An electronic switching system according to claim 5, wherein the optical couplers of each cell are electrically connected in parallel.

8. An electronic switching system according to claim 5, wherein a response time is determined by a circuit in each cell containing at least one resistor and at least one capacitor.

9. An electronic switching system according to claim 5, wherein the means for determination of the response time of the cell includes a trigger circuit which determines a response time of blocking the activation of the means for command of disconnection.

10. An electronic switching system according to claim 9, wherein the trigger circuit is controlled by a charging and a discharging of a capacitor.

11. An electronic switching system according to claim 1, wherein the means for rectification of alternating and direct line current through the cell and also for electronic separation of its ground from the other grounds of the remaining cells is a bridge of four diodes.

12. An electronic switching system according to claim 1, wherein the means for rectification of alternating and direct line current through the cell and for electronic separation of its ground from the other grounds of the remaining cells is a bridge of two diodes and two thyristors.

13. An electronic switching system according to claim 1 wherein said second electronic device includes a command transistor which, when conductive causes a connection transistor to become conductive, causing line current to flow through the means for rectification of alternating and direct line current through the cell and also for the electronically separation of its ground and through the means for filtering the line signal, causing the electrical connection of the chosen user station with the source of voltage.

14. An electronic switching system according to claim 13, in which a base of the command transistor is connected with a ground by a switch normally open, the switch when closed blocking the electronic connection of the associated station with the source of voltage.

15. An electronic switching system according to claim 14, wherein the switch that is normally open can be manually closed.

* * * * *